No. 11,906.

Reissued Apr. 16, 1901.

N. B. HARMON.

CHAIR.

(Application filed Feb. 2, 1901.)

2 Sheets—Sheet 1.

Witnesses:
M. Lawson Dyer.
Richard Ammon.

Inventor:
Nathaniel B. Harmon
By Kew, Page & Cooper, Attys.

No. 11,906. Reissued Apr. 16, 1901.
N. B. HARMON.
CHAIR.
(Application filed Feb. 2, 1901.)
2 Sheets—Sheet 2.
Fig. 6.
Fig. 3.
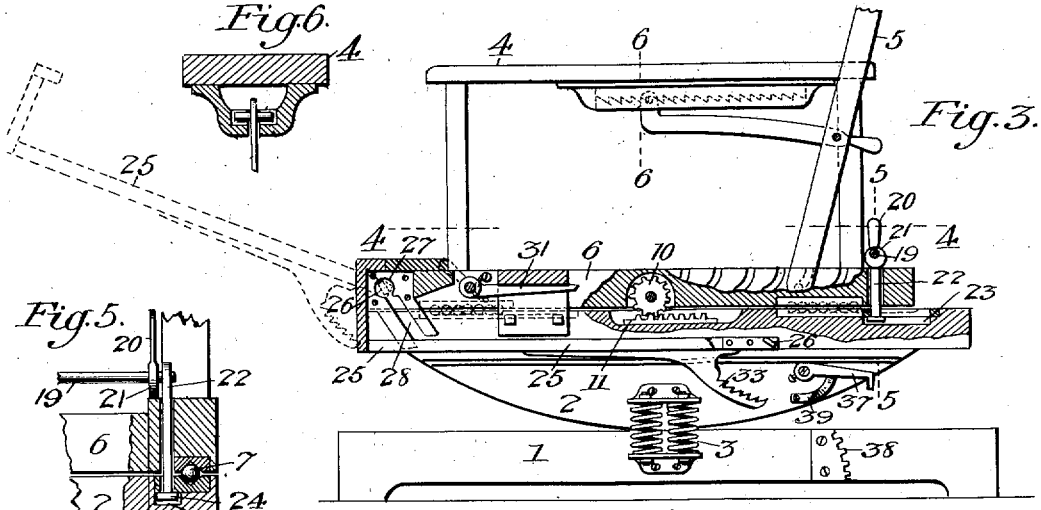
Fig. 5.
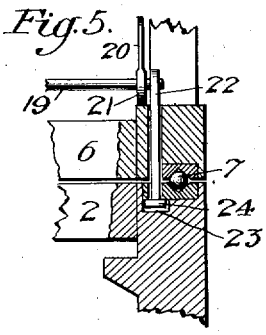
Fig. 4.
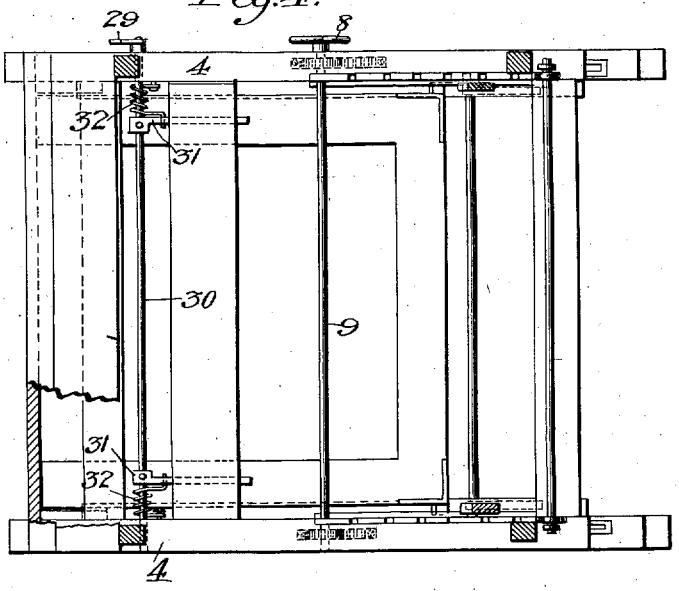
Fig. 7.
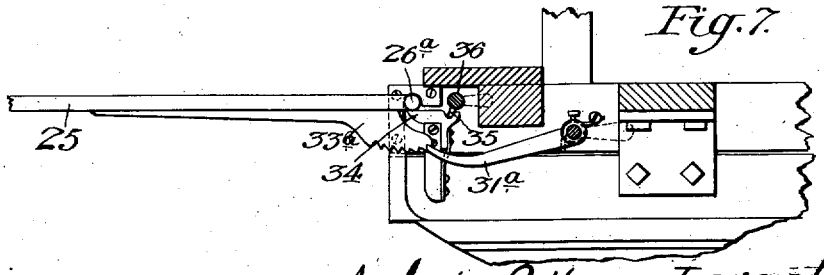
Witnesses:
M. Lawson Dyer.
Richard Lemmon.
Nathaniel B. Harmon Inventor.
By Kerr, Page & Cooper Attys.

UNITED STATES PATENT OFFICE.

NATHANIEL B. HARMON, OF BROOKLYN, NEW YORK, ASSIGNOR OF ONE-HALF TO CLAUDE M. HART, OF BOSTON, MASSACHUSETTS.

CHAIR.

SPECIFICATION forming part of Reissued Letters Patent No. 11,906, dated April 16, 1901.

Original No. 665,005, dated January 1, 1901. Application for reissue filed February 2, 1901. Serial No. 45,662.

*To all whom it may concern:*

Be it known that I, NATHANIEL B. HARMON, of New York, borough of Brooklyn, county of Kings, State of New York, have invented certain new and useful Improvements in Chairs, of which the following is a full, clear, and exact description, reference being had to the drawings which accompany and form a part of the same.

My invention is designed to secure a chair perfectly and easily adjustable to various sizes of occupants and to various positions and at the same time to maintain its balance at any adjustment, as well as to promote the perfect comfort of the occupant in any attitude.

My invention consists in the combinations and construction of parts hereinafter set forth and in the various details to which I shall refer. It is shown as applying to a rocking-chair, to which it is particularly adapted; but I do not intend to confine myself to any form of chair.

Figure 1:
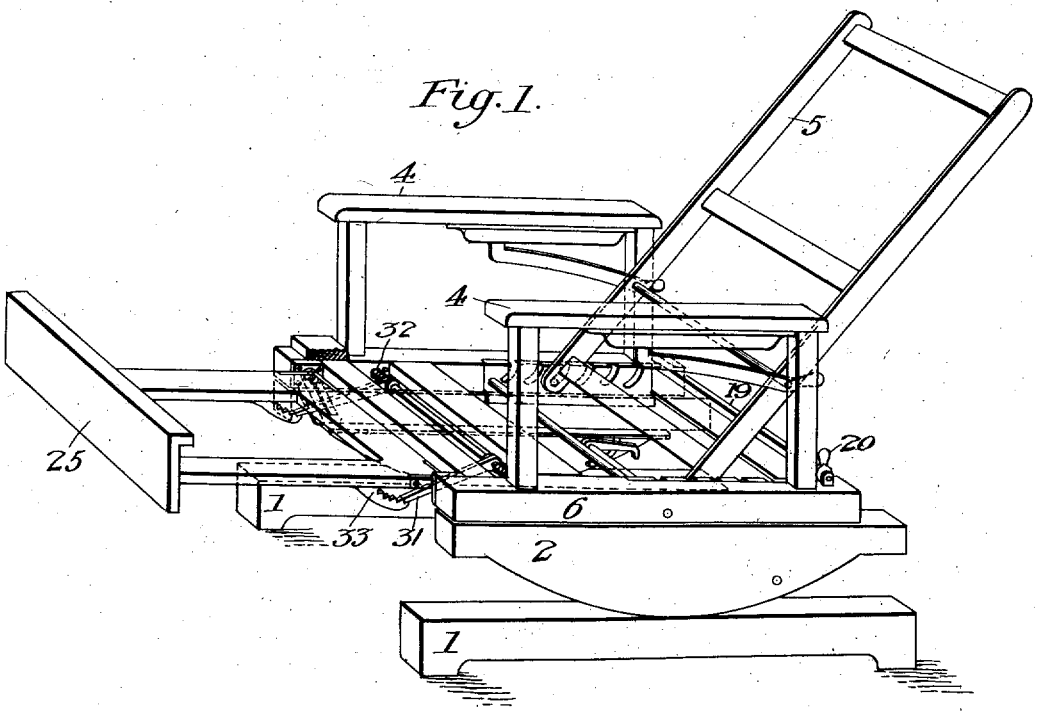
Figure 2:
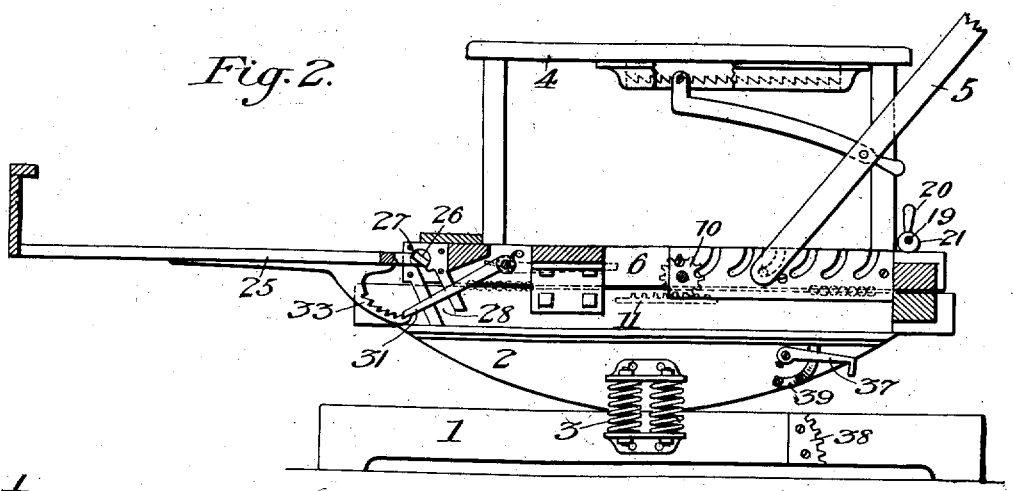

In the accompanying drawings, Figure 1 shows in perspective a chair embodying my invention. Fig. 2 is a central longitudinal section of Fig. 1. Fig. 3 corresponds to Fig. 2, with the side supports of the chair partly in section. Fig. 4 is a section upon the line 4 4 of Fig. 3. Fig. 5 is a section upon the line 5 5 of Fig. 3. Fig. 6 is a section upon the line 6 6 of Fig. 3. Fig. 7 shows an alternative form of adjusting and supporting mechanism for the foot-rest.

1 1 represent the feet of a chair, upon which are mounted the rockers 2 2, which may be maintained in normal position by springs 3 3. Upon the rockers 2 2 is supported the frame or body of the chair proper, which comprises the sides 4 4, the back 5, and the interconnected portions, which I shall describe hereinafter. The sides 4 4 are mounted upon supports or guides 6 6, which are journaled upon roller or ball bearings, (see dotted lines 7,) so that the chair-frame can be moved forward and backward upon the rockers 2, motion being imparted by a wheel 8, conveniently mounted upon a shaft 9, which carries at either end a pinion 10, which travels upon a rack 11, or by other suitable means. The object of this adjustability of the chair-frame upon the rockers is to secure a proper balance of the chair when the adjustment of the other parts disturbs it.

In order to lock the chair-body firmly in any desired position upon the rockers 2, I provide a rod 22, which extends from the upper face of the side support or guide 6 into a slot in the rocker 2. The upper end of rod 22 is attached to a rod 19, which is so attached to a cam-headed lever 20 that when the latter is depressed the rod 19 is pushed down and its head 24, which is in the slot 23, is pressed away from the upper side of slot 23. This action releases the support 6 from engagement with rocker 2—that is, "unlocks" them—and the opposite motion of lever 20 draws the head 24 tightly against the upper side of slot 23, thus locking parts 6 and 2 tightly together. It is preferred, although not essential, to have a corresponding locking arrangement on the other side of the chair and to have them connected by rod 19, so as to be operated together.

At the front of the chair I provide a foot-rest 25, which may be extended, as shown in Figs. 1 and 2 and in dotted lines in Fig. 3, or folded or pushed back under the body of the chair, as shown in the full lines, Fig. 3. This foot-rest 25 has at each side of its rear end a short flat rod 26, arranged at an angle to the length of the foot-rest. These rods 26 fit in circular sockets 27, in which they move freely. Each of these sockets 27 is provided with an oblique entering-channel 28, so disposed that when the foot-rest 25 is raised to any required angle—as, for example, that shown in the dotted lines of Fig. 3—the rod 27 may slide out, thereby permitting the foot-rest to be pushed back and folded away, as shown in Fig. 3. In order that the foot-rest may be conveniently adjusted at a desired angle, I provide at one side of the chair a lever 29, Fig. 4, fast upon a rod 30, which is rotatably mounted in the sides 6 6 of the chair, preferably near its front. Near each end this rod carries a pawl 31. The rod 30 is under the stress of a spring or springs 32, fastened to the side bars 6 6, which tend to rotate it, and with it the pawls 31, into the position shown in Figs. 3 and 4—that is, with the pawls pointing toward the back of the chair.

The foot-rest 25 is provided near its rear end with toothed racks or segments arranged to be in position for engagement by the pawls 31 when the foot-rest is drawn out, as shown in Figs. 1 and 2. When it is so drawn out, lever 29, Fig. 4, is rotated until the pawls 31 engage with the teeth of segment 33, thus holding the foot-rest at any desired angle. If the foot-rest be raised to, say, the height shown in dotted lines in Fig. 3, pawls 31 are released from the rack-bar 33 and the springs 32 will rotate rod 30, so as to throw back pawls 31 to the position shown in Figs. 3 and 4, out of the line of movement of foot-rest 25 when it is folded away, thus permitting the rods 26 to be withdrawn from the sockets 27, so that the foot-rest 25 may be folded back under the chair-body.

In Fig. 7 I have shown an alternative form of adjusting and holding device for the foot-rest. In this case the rods 26[a], which are round, are mounted upon a spring-catch 34, which is retracted by a finger 35 upon the rod or lever 36. As here shown, the rack or segment 33[a] is convex instead of concave, as before, and the pawl is curved to contact properly with it. The operation of this modified form will, I believe, be readily understood.

I provide a hook or latch 37, Fig. 3, upon the rear half of one or both of the rockers 2 and a series of catches or notches 38 on the base 1 to secure the chair in position, if desired, when it is rocked back. A flat curved spring 39 upon the rocker will serve to keep hook 37 in either position and prevent it from swinging.

For the sake of convenience and beauty I arrange as many as possible of the devices which I have described under the body of the chair and inside of the rockers.

From the foregoing it will be understood that there are several adjustments possible in the chair provided for by my invention.

First. The adjustment of the foot-rest 25. This is accomplished by pulling foot-rest 25 from its folded position beneath the body of the chair, Fig. 3, elevating its front end until the rods 26 will slide up slots 28 to sockets 27, then lowering the front end to the desired position and at the same time rotating pawls 31 (by means of lever 29 and rod 30) until they engage with the rack 33, or this may be done by the alternative devices shown in Fig. 7.

Second. The adjustment of the main body of the chair longitudinally upon the rockers 2. This is chiefly necessary to restore the proper balance of the chair-body after adjusting the foot-rest or for other reasons. It is accomplished by depressing lever 20, so as to unlock guides 6 from rockers 2, (by depressing the headed rod 22 in slot 23 through the rotation of cam 21.) Then the wheel 8 is rotated, causing pinions 10, which carry the chair-body, to travel over racks 11 upon the rockers 2 until the required relative positions of the two are reached. Then lever 20 is thrown back again to relock the parts.

Third. If it is desired to rock the chair-body back and hold it there, this may be done by hooking the hook or latch 37 into one of the notches 38.

The drawings show an adjustable chair-back 5 of peculiar arrangement or construction. While I do not make any claim to this improvement here, I do not abandon it, but make it the subject of a separate application for Letters Patent.

It will be seen that the chair-frame which I show is entirely bare of upholstery and is typical or conventional in form. These are of course matters of no consequence, this simple form being adopted to show clearly my invention.

It will occur to any one that the devices and arrangements which I will show and describe may be varied widely without going beyond the scope of my invention and that many of them may be applied to chairs other than rocking-chairs.

What I claim is—

1. In a rocking-chair, the combination of supports for the chair-body, rockers upon which said supports are movably mounted, means for shifting said supports longitudinally, and means for locking said supports to said rockers, substantially as and for the purposes described.

2. In a rocking-chair, the combination of rockers, supports movably mounted upon said rockers, bearings between said rockers and said supports, means at the side of the chair for shifting said supports longitudinally upon said rockers, and means at the rear of said chair for locking together said supports and said rockers, substantially as and for the purposes described.

3. In an adjustable chair, the combination of a supporting-frame, a chair-body longitudinally adjustable thereon, a rod carried by said chair-body and adapted to slide freely in a longitudinal direction in a slot in said supporting-frame, a head upon said rod adapted to contact with the upper face of said slot, and a cam-headed lever operatively connected with the outer end of said rod for raising and depressing the same, substantially as and for the purposes described.

4. In a chair, the combination of a chair-body, a foot-rest adapted to be folded or slid under said body, hinges, capable of being disconnected between said foot-rest and said chair-body, one or more racks mounted on the rear end of said foot-rest, pawls rotatably mounted upon said chair-body for engaging with said racks, and means for withdrawing said pawls when disengaged from said racks out of the line of movement of said foot-rest, substantially as and for the purposes described.

5. In a chair, the combination of a chair-body provided at its forward end with sockets provided with entering-slots extending obliquely downward, a foot-rest adapted to be folded under the chair-body, laterally-extending flat rods upon the rear of said foot-rest for engaging with said sockets, and means, substantially as described, for securing said foot-rest at any desired angle to said chair-body, substantially as and for the purposes described.

6. In a chair, the combination of a chair-body a rod extending transversely under its forward end, a lever or handle for rotating said rod, pawls mounted upon said rod near each end and a foot-rest hinged to said chair-body and having at its rear end racks in the line of movement of said pawls, and adapted to be engaged, thereby, substantially as and for the purposes described.

7. In a rocking-chair, the combination of a chair-body, a foot-rest adapted to be folded or slid under said body, and independent means for adjusting the balance of the chair-body upon the extension and folding of the foot-rest, substantially as and for the purposes described.

NATHANIEL B. HARMON.

Witnesses:
M. LAWSON DYER,
DRURY W. COOPER.